No. 627,838. Patented June 27, 1899.
W. F. WILLIAMS.
ELASTIC TIRE AND RIM FOR WHEELS.
(Application filed Jan. 6, 1899.)
(No Model.) 3 Sheets—Sheet 1.
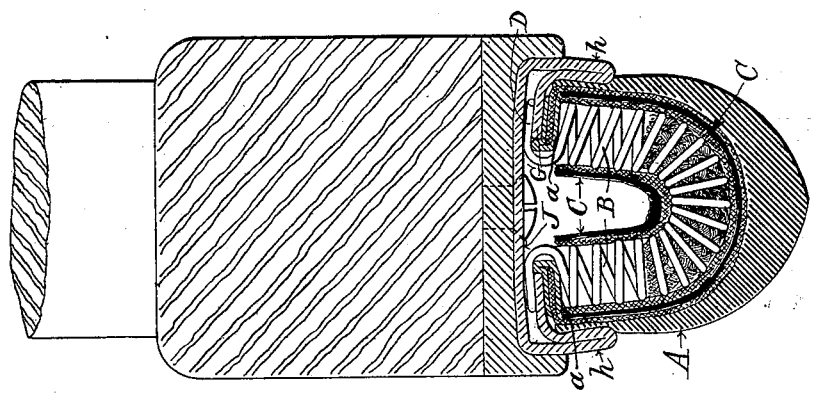
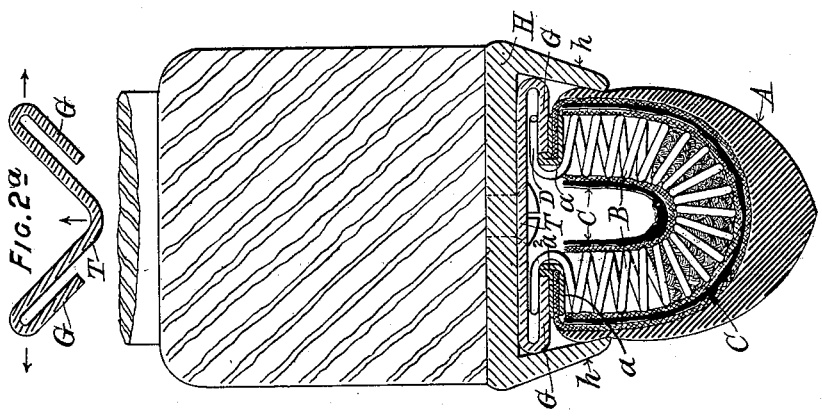
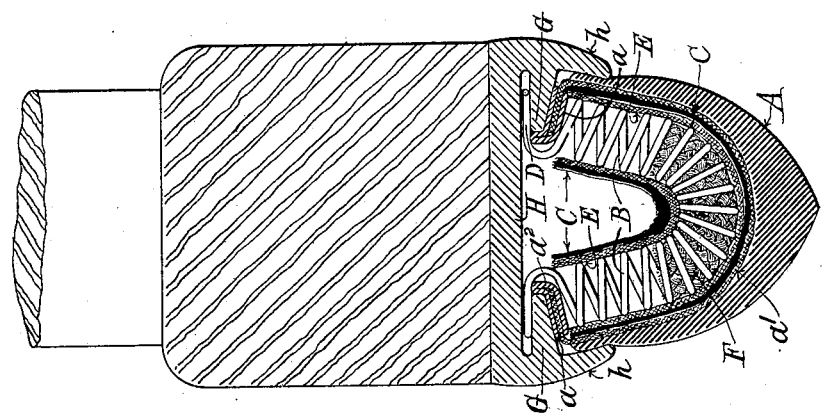
Witnesses.
Inventor:
William F. Williams
By
Attorneys.

No. 627,838. Patented June 27, 1899.
W. F. WILLIAMS.
ELASTIC TIRE AND RIM FOR WHEELS.
(Application filed Jan. 6, 1899.)
(No Model.) 3 Sheets—Sheet 2.
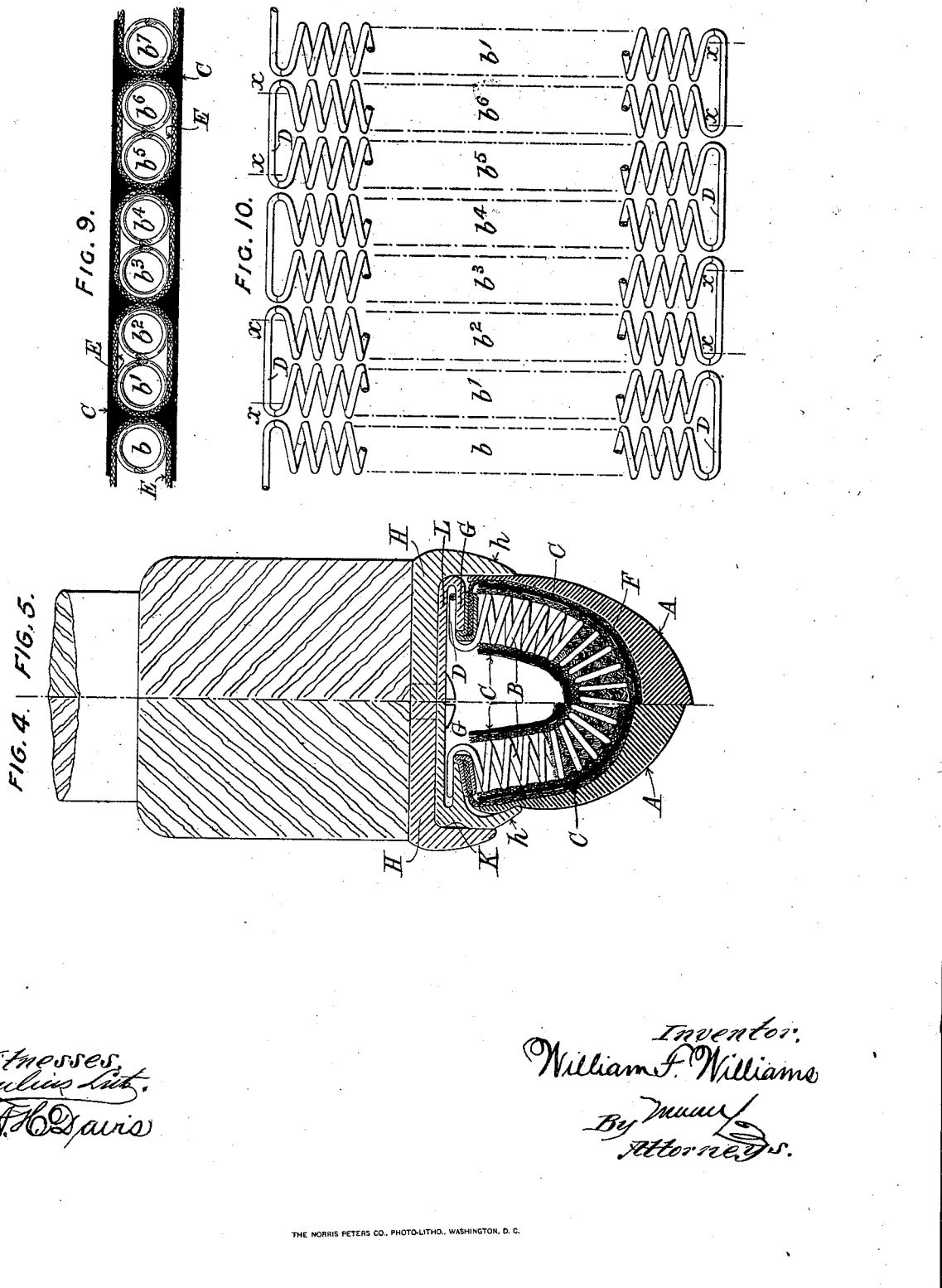

No. 627,838. Patented June 27, 1899.
W. F. WILLIAMS.
ELASTIC TIRE AND RIM FOR WHEELS.
(Application filed Jan. 6, 1899.)
(No Model.) 3 Sheets—Sheet 3.
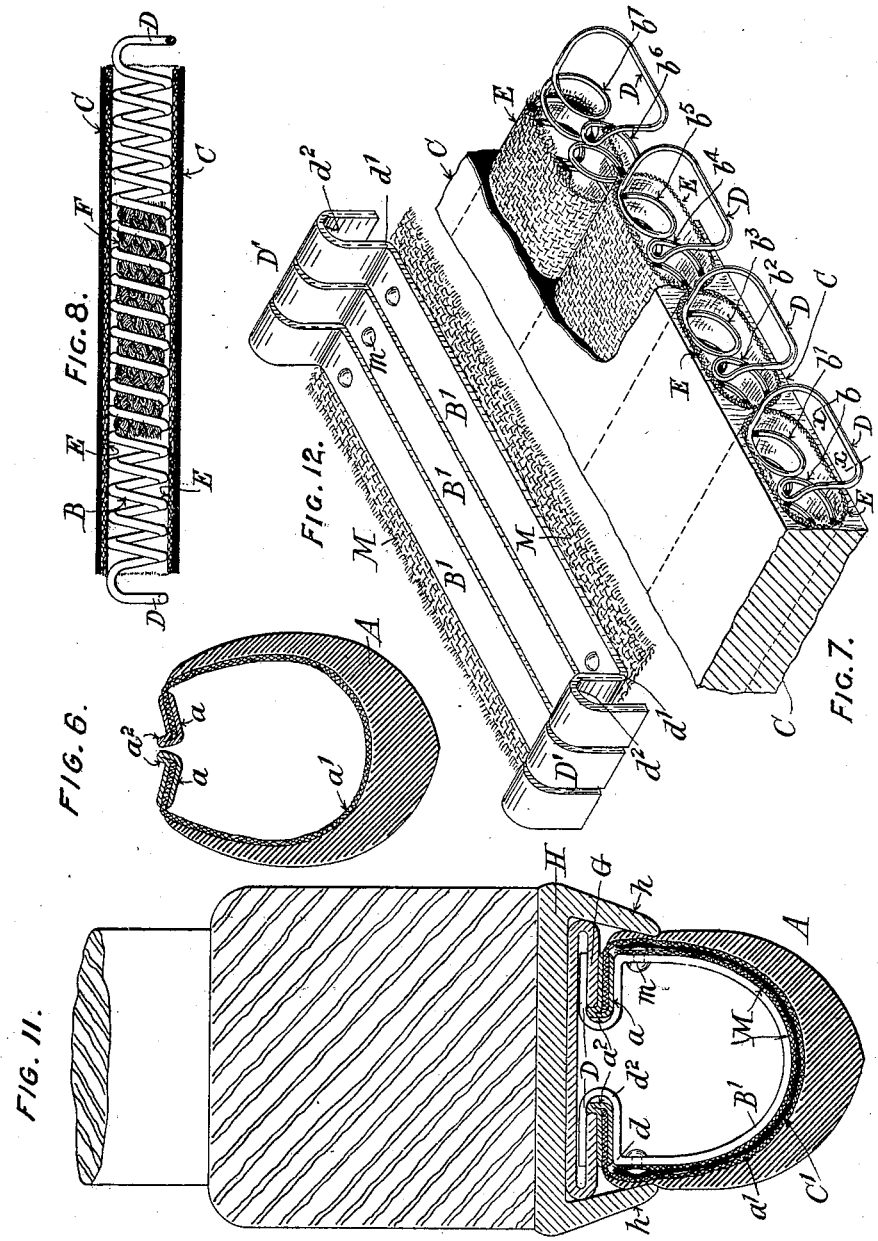

UNITED STATES PATENT OFFICE.

WILLIAM FREDERICK WILLIAMS, OF LONDON, ENGLAND.

ELASTIC TIRE AND RIM FOR WHEELS.

SPECIFICATION forming part of Letters Patent No. 627,838, dated June 27, 1899.

Application filed January 6, 1899. Serial No. 701,367. (No model.)

*To all whom it may concern:*

Be it known that I, WILLIAM FREDERICK WILLIAMS, gentleman, a resident of 32 Shaftesbury avenue, London, W., England, have invented new and useful Improvements in Elastic Tires and Rims for Wheels, (for which an application for patent has been filed in Great Britain, dated June 10, 1898, No. 13,038,) of which the following is a full, clear, and exact description.

My invention relates to improvements in elastic tires for the wheels of vehicles and to the means of securing a firm connection of such an elastic tire to the wheel-rim under all circumstances incidental to street traffic.

The improvement in the construction of the elastic tire is mainly designed to insure greater security of attachment to the rim and to facilitate the manufacture of the tire and increase its durability by enabling the cover or tread of the tire alone to be renewed when worn.

The invention is illustrated in the accompanying drawings, forming part of this specification, wherein—

Figures 1, 2, and 3 show cross-sections, and Figs. 4 and 5 show half-sections, of elastic tires formed with helical springs and differing only in respect of certain details of the means of securing the tire to the wheel-rim. Fig. 2ª shows the sectional form to which the liner is rolled in the first instance before being introduced between the inwardly-inclined flanges of the wheel-rim shown in Fig. 2. Fig. 6 shows a cross-section of the tire-cover separately. Figs. 7, 8, 9, and 10 show details of the construction of the inner or spring portion of the tire, Fig. 7 being a part perspective view of a short length of such inner portion in the flat, with parts broken away to illustrate the formation, Fig. 8 a cross-section, and Fig. 9 a longitudinal section, of the same, and Fig. 10 a plan or face view of a short length of the internal spring. Fig. 11 shows a cross-section of an elastic tire formed with flat springs, and Fig. 12 shows a perspective view of a few of the springs before being bent to the arched form.

The elastic tire consists of an outer cover or jacket A, which may be mainly of rubber, and of an inclosed inner portion composed of springs B, united by being covered with rubber C, so as to form a continuous strip, these two main parts (A and C) being entirely separate from each other and their construction and mode of attachment to the wheel-rim being as follows:

As shown in Figs. 1 to 10, the springs B are of helical form and are situated close together side by side in the transverse direction of the tire. The springs may be formed of one continuous length of wire by being coiled in successive helices all coiled in the same direction or in the form of right and left handed helices alternately, as represented at $b$ $b'$ $b^2$ $b^3$, &c., in Figs. 7 and 10, the ends of adjacent coils being connected in pairs alternately at opposite ends of the springs by connecting members D of wire—that is to say, the springs $b$ $b'$ are connected at the one end, while the other end of spring $b^2$ is connected to the adjacent end of $b^3$ by a similar member, and the opposite end of $b^3$ is similarly connected to $b^4$, and so on, for any number or the whole series of springs composing the tire. The springs being thus connected not only serve to mutually assist to support each other in position, but the U-shaped recurved connecting members of wire D, &c., serve the purpose of effecting an interlocking engagement of the springs with the wheel-rim, as hereinafter described. The springs thus continuously connected may best be formed by coiling successive lengths alternately of right and left handed direction upon a straight mandrel (with the aid of suitable clamping appliances to form the U-shaped members and effect the change of direction of coiling) and then bending the series of alternately opposite handed coils to and fro zigzag fashion, so as to bring the coils parallel to each other side by side, with the U-shaped connecting members of wire D in the position shown in Figs. 7 and 10. The springs thus formed are placed in a mold and enveloped in rubber C or equivalent material, so as to form therewith a transversely-flexible strip having the springs embedded transversely in the rubber, which fills up the spaces between the springs, so as to form continuously flat top and bottom surfaces, the edges of the strip being at right angles to said surfaces and flush with the ends of the helical springs, the connecting members D alone projecting from the edges of the strip.

In order to economize rubber and preserve greater freedom of elasticity for the springs, the rubber in which they are embedded is excluded from the interior of the coils, and for this purpose the springs before being placed in the mold are inclosed in tubular sheaths E of plaited or woven cotton or other suitable material. For this purpose I find ordinary tubular lamp-wick suitable, and as the springs are connected as above described each tubular sheath would conveniently inclose two adjacent springs, as shown in Figs. 7 and 9.

In order to prevent the rubber from being cut or injured in consequence of being forced between the convolutions of the spring by the pressure due to the weight of the load on the wheel, the middle portions at least of the springs are filled by flexible cores F, formed, preferably, of short lengths of plaited or other cord, so as without impeding the flexibility of the springs to afford the internal support necessary to prevent the squeezing of the rubber between the coils.

The U-shaped connecting members D where they emerge from the edges of the embedding rubber strip are bent hookwise, as shown, those at the one edge and those at the other edge being all directed toward the same face of the strip, so that when the latter is bent to a transversely-arched form, as shown in Figs. 1 to 5, and is placed within the groove of the wheel-rim the hook-like U-shaped connecting members D will be outwardly directed and in position to engage with inturned flanges G, formed, fixed, or otherwise provided within the grooved wheel-rim H and with which the U-shaped hooks D are held in interlocking engagement by the tendency of the tire to expand laterally and resume its original flat form. I do not, however, limit myself to helical springs formed in one continuous length of wire, as separate springs may be used—that is to say, the portion of the U-shaped connecting member comprised between the letters $x\,x$ in Figs. 7 and 10 may be dispensed with, leaving only the hook-like ends of the springs, and the latter may therefore be coiled all in the same direction, as will be readily understood, the separate hook-like ends engaging with the flanges of the wheel-rim in the same way as do the complete U-shaped connecting members above described. In this case each separate spring may be enveloped in a tubular sheath E and be filled with a core F and the whole embedded in rubber to form a strip as before from the edges of which the hook-like ends of the spring project as before.

Instead of the springs B being of helical form, as above described, they may be formed of flat strips B', as shown in Fig. 12, having their ends reversely bent, as shown at $d'\,d^2$, so as to form hooked ends D', adapted to abut against and to engage with the flanges G of the wheel-rim in precisely the same way as above mentioned in respect of the U-shaped members connecting the spiral springs before described. These plate-springs would be connected by a strip of canvas M, (preferably on the bias,) secured to the springs by attachments, such as rivets $m$, the ends of the strip being united to form a complete annulus, the face of the canvas being afterward coated with rubber C'. The annular strip thus formed is bent to a transversely-arched form and is applied, together with an outer cover A, to the wheel-rim provided with internally-projecting flanges G, with which the ends D' of the springs engage, as shown in Fig. 11, and between which flanges G and the parts from $d'$ to $d^2$ of the bent ends D' of the springs the flanges $a$ of the cover A are clamped, as described in respect of the spiral-spring construction.

The cover A is of rubber or equivalent material molded of arched form in cross-section, thick at the middle of its width, which forms the tread or wearing surface, and thinned off toward the side edges. In order that the rubber at the thick tread or wearing portion shall not be stretched, but shall be in a state of compression, and consequently more wear-resisting when the cover is applied upon the wheel over the spring-supporting interior portion, the cover is molded, preferably, of an initially-contracted arched form in the transverse direction, as indicated in Fig. 6, and in the circumferential direction to a curve of considerably less radius than that of the whole tire on which it is to be applied, so that it will require to be sprung open both laterally and circumferentially in order to apply it, and will not tend to spring off, but will cling onto the interior supporting-spring portion. For this purpose the cover is molded upon a mandrel of relatively small section and of annular or spiral form, the radius of the annulus or the maximum radius of the spiral being, say, half that of the wheel. If molded of annular form, it would require to be cut to form a length, and two such lengths would be joined up end to end by vulcanization to form one complete cover; but if of spiral form the spiral might be of a sufficient number of convolutions to form the required length, whose ends would be butt-jointed by vulcanization to form a complete cover.

To enable the cover to be securely attached, its edges are provided with inwardly-projecting flanges of metal $a$, made in short lengths and formed, preferably, by doubling and clamping a strip of sheet metal longitudinally upon itself and upon an intervening canvas strip $a'$, solutioned to the inner surface or embedded in the thickness of the rubber, the edges of the canvas projecting beyond the edges of the rubber, so as to be clamped by the metal strips or flanges $a$ and form flexible hinges therefor. The cover A is adapted to embrace the spring-embedding strip C, so that the flanges $a$ engage with the edges of said strip and when the tire is applied to the wheel become clamped between the edges of the spring-strip C and the inwardly-projecting flanges G of the wheel-rim, which form both an abutment for the spring-strip C against the pressure due to the weight of the load and a means of engagement by the hooks D for retaining the spring-strip upon the wheel-rim, the same means thus serving to securely retain both the inner part and cover of the tire in position on the wheel. The free edge of each flange $a$ is preferably bent at right angles, as at $a^2$, so as to be adapted to make a secure connection with the inwardly-directed flanges G of the wheel-rim, as indicated in Figs. 1, 2, 3, 4, 5, and 11.

The wheel-rim H may either have the inwardly-projecting flanges G rolled or otherwise formed solid with it, as shown in Fig. 1, or these may be formed separately, as hereinafter described with reference to Figs. 2, 3, 4, and 5, the side cheeks $h$ of the rim projecting to a sufficient depth beyond the inwardly-projecting flanges G to receive and confine the sides of the tire between them, as shown, and by preventing lateral expansion of the tire under compression due to the weight of the load relieve the hooks D of the lateral thrust, so that their only duty will be to maintain such an interlocking engagement of the tire with the wheel-rim as will avoid all liability of the tire springing off.

The mode of applying the tire to the wheel-rim is the same in all cases. The annular cover A is applied upon the internal spring-strip C, with its flanges $a$ tucked inward within the curve of the hooks D, so as to embrace the edges of the part C, and then the tire is compressed by suitable clamping devices so as to bring it to a contracted arch form, with its side edges close together, so as to admit of the hooks D being inserted, first those at one side and then those at the other side, beneath the corresponding flanges G, so as to make a secure interlocking engagement therewith, when the tire is allowed to spring outward laterally into the position shown.

In Fig. 2 the rim H is of the ordinary form as now used for solid-rubber tires—that is to say, with inwardly-inclined side cheeks $h$—and the locking-flanges G are formed by the inwardly-turned edges of a liner-strip T, which is rolled of the cross-sectional form shown in Fig. $2^a$, so as to be contracted in width sufficiently to admit of passing it between the side cheeks $h$, and is brought to the flattened form after being so inserted, so as to fit tightly in the channel of the rim, to which the ends of this liner-strip are secured by screws, or the ends may be united by a joint-covering piece and rivets or otherwise.

In Fig. 3 the rim H is rolled of right-angled section, the locking-flanges G and side cheeks $h$, which retain the elastic tire, being formed by the liner-strip J, rolled of the folded cross-sectional form shown and fitted in the groove of the rim H, the ends of the liner-strip being butt-jointed and screwed or otherwise united to the rim H.

The modification shown in half-section in Fig. 4 differs only from Fig. 3 in that the liner K is rolled with a solid flange G like that of the rim in Fig. 1 instead of being folded, as in Fig. 3, while the modification shown in the other half-section, Fig. 5, differs only from Fig. 2 in that the side cheeks of the wheel-rim H are not inclined inward, and therefore the liner L can be at once rolled as a band of flat cross-section with inwardly-curved flanges G and be laid directly in the rim H and be secured thereto by screws at its butt-jointed ends and at suitable intervals around its circumference.

I claim—

1. The combination with a wheel-rim of channeled section having flanges inwardly projecting from the side cheeks of the rim at a point intermediate of the bottom of the channel and the edges of the cheeks, of an elastic-tire support formed of a connected series of juxtaposed transversely-extending springs of normally straight form with U-shaped hooked ends said springs being adapted to be curved to an arched form in the transverse direction of the tire and when so bent tending to force the U-shaped ends outward into engagement with the said inwardly-projecting flanges of the rim whereby the springs are retained in the arched form and in engagement with the wheel-rim, as described.

2. The combination with a wheel-rim of channeled section having flanges inwardly projecting from the side cheeks of the rim at a point intermediate of the bottom of the channel and the edges of the cheeks, of an elastic tire formed of an endless outer cover of transversely-arched section, provided with inwardly-projecting rigid flanges in short lengths and inclosing a connected series of juxtaposed transversely-extending springs, bent to an arched form and provided with hooked ends which engage with the said inwardly-projecting flange of the rim, the sides of the cover being held between the cheeks of the rim and the inwardly-directed flanges of the cover clamped by the springs against the inwardly-projecting flanges of the rim, substantially as specified.

3. The combination with a wheel-rim of channeled section having flanges inwardly projecting from the side cheeks of the rim at a point intermediate of the bottom of the channel and the edges of the cheeks, of an elastic tire formed of an endless strip of rubber having embedded therein juxtaposed transversely-extending helical springs, formed of continuous wire united two by two alternately at opposite ends by recurved or hook-shaped connecting members which alone project from the edges of the strip in which the coils are embedded, the strip when applied to the rim being bent to a transversely-arched form, and the said hook-like parts being engaged with the said inwardly-projecting flanges of the rim and being retained in such engagement by the laterally-expanding tendency of the strip, substantially as specified.

4. The combination with a wheel-rim of channeled section inclosing flanges inwardly projecting from the side cheeks of the rim at a point intermediate of the bottom of the channel and the edges of the cheeks, of a spring-embedding strip, an elastic-tire support, and of an endless outer cover of rubber of arched cross-section, provided with inwardly-projecting rigid flanges in short lengths adapted to embrace the edges of the spring-embedding strip, and to be gripped between the edges of the strip and the inwardly-projecting flanges of the rim when the strip is bent to a transversely-arched form and its hook-like lateral extensions are engaged with the said flanges as described, the cover fitting between the side cheeks of the rim which project beyond the inwardly-projecting flanges, whereby the flanges of the cover are retained in position and the tire retained in the arched form, as described.

5. In an elastic tire for vehicle-wheels, the combination, with springs formed of continuous wire coiled in helices connected two by two alternately at opposite sides by recurved or hook-shaped cross members, the juxtaposed springs being embedded in a rubber strip in which they extend transversely, of cores of plaited rope filling the middle portions of the springs, substantially as and for the purpose specified.

6. In an elastic tire for vehicle-wheels, the combination, with springs formed of continuous wire coiled in helices connected two by two alternately at opposite sides by recurved or hook-shaped cross members, of tubular sheaths of plaited fibrous material enveloping the juxtaposed springs two by two, and of a rubber strip in which the springs thus enveloped are embedded, as described.

7. In a vehicle-wheel having a rim of channeled section, the combination of a liner having inwardly-recurved flanges, said liner being fixed within the channel of the rim as described, and of an elastic tire formed of a strip of rubber having embedded therein juxtaposed transversely-extending helical springs, connected as described by recurved or hook-like members which project from the edges of the strip, and of an endless cover therefor provided with inwardly-projecting flanges at its edges, the tire when applied to the wheel being bent of transversely-arched form and the recurved or hook-like members being engaged with the inwardly-projecting flanges of the liner, the flanges of the cover being gripped between the said flanges of the liner and the edges of the spring-embedding strip and the cover being confined between the side cheeks of the rim, substantially as specified.

Signed by me, WILLIAM FREDERICK WILLIAMS, this 22d day of December, 1898.

WILLIAM FREDERICK WILLIAMS.

In presence of—
C. G. CLARK,
T. W. KENNARD.